(12) United States Patent
Borgmann et al.

(10) Patent No.: US 10,533,630 B2
(45) Date of Patent: Jan. 14, 2020

(54) BELTING CONNECTION MECHANISM

(71) Applicant: Spudnik Equipment Company, LLC, Blackfoot, ID (US)

(72) Inventors: Rainer Borgmann, Idaho Falls, ID (US); Evan Steel, Blackfoot, ID (US); Michael A. Schroeder, Wahpeton, ND (US); Mark Beyer, Wahpeton, ND (US)

(73) Assignee: Spudnik Equipment Co., LLC, Blackfoot, ID (US)

( * ) Notice: Subject to any disclaimer, the term of this patent is extended or adjusted under 35 U.S.C. 154(b) by 0 days.

(21) Appl. No.: 15/883,855

(22) Filed: Jan. 30, 2018

(65) Prior Publication Data

US 2018/0223951 A1 Aug. 9, 2018

Related U.S. Application Data

(60) Provisional application No. 62/454,264, filed on Feb. 3, 2017.

(51) Int. Cl.
*F16G 3/08* (2006.01)
*B65G 15/34* (2006.01)
*B65G 17/42* (2006.01)
*F16G 3/10* (2006.01)

(52) U.S. Cl.
CPC ............... *F16G 3/08* (2013.01); *B65G 15/34* (2013.01); *B65G 17/42* (2013.01); *F16G 3/10* (2013.01); *B65G 2812/02198* (2013.01); *B65G 2812/02356* (2013.01); *B65G 2812/02396* (2013.01)

(58) Field of Classification Search
CPC ............ F16G 3/08; B65G 15/34; B65G 17/42

USPC ........................................................ 198/844.2
See application file for complete search history.

(56) References Cited

U.S. PATENT DOCUMENTS

| 1,303,027 | A | 5/1919 | Carr |
| 2,801,452 | A | 8/1957 | Adams, Jr. |
| 3,748,699 | A | 7/1973 | Cunningham |
| 4,371,580 | A | 2/1983 | Morrison |

(Continued)

OTHER PUBLICATIONS

International Search Report and Written Opinion for PCT/US2018/015952, dated Apr. 19, 2018, 16 pgs.

*Primary Examiner* — Douglas A Hess
(74) *Attorney, Agent, or Firm* — Progress Patent Law, PLLC; David M. McKinney

(57) ABSTRACT

A belting connection for attaching a first end and a second end of belting. The belting has a thickness. The belting connection mechanism includes a first stepped region, a second stepped region and a first fastener. The first stepped region is proximate the first end. The first stepped region has a first aperture formed therein. The first stepped region has a first thickness. The second stepped region is proximate the second end. The second stepped region has a second aperture formed therein. The second stepped region has a second thickness. The first fastener extends through the first aperture and the second aperture to attach the first end to the second end. The first stepped region at least partially overlaps the second stepped region when the first end is attached to the second end. When the first end is attached to the second end, the first stepped region and the second stepped region have a combined thickness that is no greater than the thickness of the belting.

19 Claims, 2 Drawing Sheets

(56) References Cited

U.S. PATENT DOCUMENTS

| | | | |
|---|---|---|---|
| 4,518,647 A | 5/1985 | Morrison | |
| 4,558,492 A * | 12/1985 | Hite | F16G 3/02 |
| | | | 198/847 |
| 4,705,495 A | 11/1987 | Madion | |
| 5,698,358 A | 12/1997 | Yu | |
| 6,345,925 B1 * | 2/2002 | Coleman | F16B 5/0088 |
| | | | 198/844.2 |
| 6,436,502 B1 | 8/2002 | Swift | |
| 6,601,698 B2 * | 8/2003 | Jakob | F16G 3/00 |
| | | | 198/844.2 |
| 7,077,263 B1 * | 7/2006 | Richardson | F16G 3/08 |
| | | | 198/844.2 |
| 7,980,979 B2 † | 7/2011 | Jakob | |
| 8,002,110 B2 | 8/2011 | Degroot | |
| 8,365,906 B2 * | 2/2013 | Moeschen-Siekmann | |
| | | | F16G 3/09 |
| | | | 198/844.2 |
| 8,720,675 B2 * | 5/2014 | Gentz | B65G 15/34 |
| | | | 198/844.1 |
| 9,033,139 B2 * | 5/2015 | Jager | B65G 15/48 |
| | | | 198/850 |
| 9,248,970 B2 * | 2/2016 | Schneider | B65G 17/12 |
| 9,428,340 B2 * | 8/2016 | Gilg | B23K 1/002 |
| 2005/0113200 A1 | 5/2005 | Okuno | |
| 2013/0256101 A1 | 10/2013 | Gentz | |

\* cited by examiner
† cited by third party

BELTING CONNECTION MECHANISM

REFERENCE TO RELATED APPLICATION

This application claims priority to Provisional Applic. No. 62/454,264, filed on Feb. 3, 2017, the contents of which are incorporated herein by reference.

FIELD OF THE INVENTION

The invention relates to belting. More particularly, the invention relates to a belting connection mechanism.

BACKGROUND OF THE INVENTION

Because of their ability to move large amounts of material, conveyor belts have been long used in industry such as for moving agricultural products. One area in which conveyor belts are extensively used is equipment for moving agricultural products and, in particular, agricultural equipment that is used for harvesting. Wide-aspect belts are extensively used in farm machinery, especially harvesting implements, examples of which are discussed in U.S. Pat. Nos. 4,371,580 and 4,518,647.

Because of the nature of the equipment on which the belting is used, it is typically not possible for the belting to be formed in a continuous loop. Rather, the belting is typically formed with two opposite ends that are attached together when the belting is installed on the equipment.

The belting connection mechanism needs to have a strength that is comparable to the strength of the other portions of the belting. The belting connection mechanism also needs to have a flexibility that is similar to the flexibility of the other portions of the belting to facilitate the belting extending around rollers. The belting connection mechanism further needs to have a thickness that is similar to the thickness of the other portions of the belting.

While a variety of belting connection mechanisms have been developed, such prior art belting connection mechanisms have been deficient on one or more of the preceding elements and as a result of such deficiencies, the belting, the belting connection mechanism and/or the equipment on which the belting is installed exhibited deficient operational performance.

SUMMARY OF THE INVENTION

An embodiment of the invention is directed to a belting connection for use in attaching a first end and a second end of belting. The belting has a thickness. The belting connection mechanism includes a first stepped region, a second stepped region and a first fastener. The first stepped region is proximate the first end. The first stepped region has a first aperture formed therein. The first stepped region has a first thickness. The second stepped region is proximate the second end. The second stepped region has a second aperture formed therein. The second stepped region has a second thickness. The first fastener that extends through the first aperture and the second aperture to attach the first end to the second end. The first stepped region at least partially overlaps the second stepped region when the first end is attached to the second end. When the first end is attached to the second end, the first stepped region and the second stepped region have a thickness that is no greater than the thickness of the belting.

Another embodiment of the invention is directed to a conveyor belt that includes belting and a first fastener. The belting has a first end and a second end. The belting includes a fabric base, a first stepped region, a second stepped region and a reinforcing member. The fabric base is substantially coated with a rubber material. The first stepped region is proximate the first end. The first stepped region has a first aperture formed therein. The second stepped region is proximate the second end. The second stepped region has a second aperture formed therein. The reinforcing member is associated with at least one of the first stepped region and the second stepped region. The first fastener extends through the first aperture and the second aperture to attach the first end to the second end. When the first end is attached to the second end, the first stepped region and the second stepped region have a combined thickness that is no greater than the thickness of the belting Another embodiment of the invention is directed to a method of connecting belting having a first end and a second end. The belting has a thickness. A first stepped region is provided proximate the first end. The first stepped region has a first aperture formed therein. The first stepped region has a first thickness. A second stepped region is provided proximate the second end. The second stepped region has a second aperture formed therein. The second stepped region has a second thickness. The first stepped region is positioned at least partially overlapping the second stepped region. A first fastener is extended through the first aperture and the second aperture to attach the first end to the second end. When the first end is attached to the second end, the first stepped region and the second stepped region have a combined thickness that is no greater than the thickness of the belting.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

The belting connection mechanism of this invention provides enhanced strength and enhanced flexibility when compared with prior art belting connection mechanisms. The belting connection mechanism also has a thickness that is no greater than a thickness of the other portions of the belting.

In other embodiments, the thickness of the belting connection mechanism is approximately the same as the thickness of the other portions of the belting.

Figure 1:
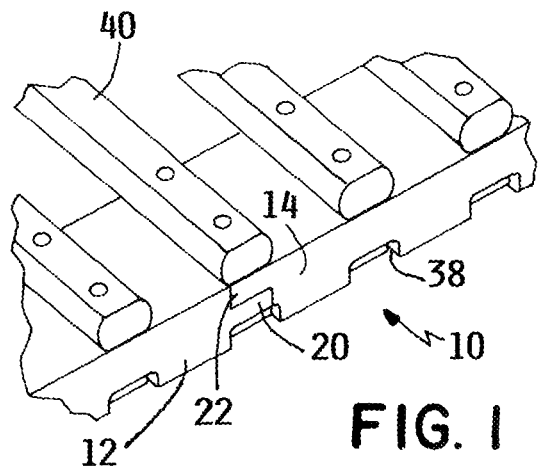
FIG. 1 is a perspective view of a belting connection mechanism according to an embodiment of the invention.

The invention is particularly suited for use in conjunction with chaing conveyors that have belting strips proximate opposite edges thereof and connecting rods or slats 40 that extend between the belting strips. FIG. 1 illustrates the attachment of the connecting rods 40 to one of the belting strips. While not illustrated, the other edge of the belting would have a similar configuration with the connecting rods 40 attached to the belting strips. Because of the relatively narrow belting strips at opposite edges of the chaing conveyors, the forces placed on opposite ends of the belting strips is more concentrated than conventional belting that extends across the width of the conveyor.

Figure 2:
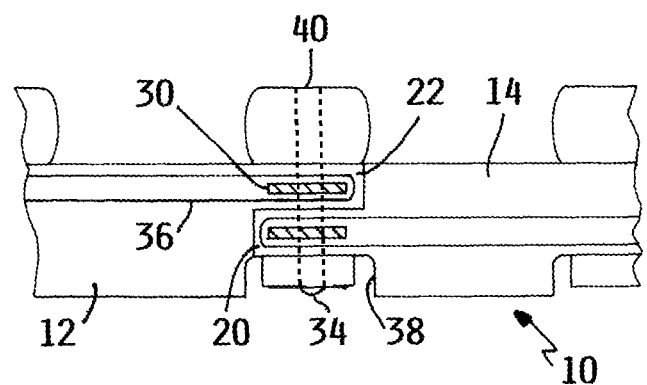
FIG. 2 is a side view of the belting connection mechanism of FIG. 1.

The belting 10 such as illustrated in FIGS. 1 and 2 includes a first end 12 and a second end 14 that is opposite the first end 12. When the belting 10 is installed on equipment (not shown), the first end 12 is attached to the second end 14.

Proximate the first end 12, a first stepped region 20 is provided on the belting 10. A thickness of the first stepped region 20 is less than a thickness of the belting 10 adjacent to the first stepped region 20. As used herein, the term thickness relates to a distance in a direction that is generally perpendicular to a lower surface of the belting 10. In certain embodiments, the first stepped region 20 has a height that is about ½ of the thickness of the belting 10 adjacent to the first stepped region 20.

Proximate the second end 14, a second stepped region 22 is provided on the belting 10. A thickness of the second stepped region 22 is less than the thickness of the belting 10 adjacent to the second stepped region 22. In certain embodiments, the thickness of the second stepped region 20 is about ½ of the thickness of the belting 10 adjacent to the second stepped region 22.

Using such a configuration results in the height of the belting 10 being approximately equal to the height of the first stepped region 20 plus the height of the second stepped region 22 when the first end 12 is attached to the second end 14.

The first stepped region 20 is offset from the second stepped region 22 so that when the first end 12 is positioned adjacent the second end 14, the first end 12 extends into the second stepped region 22 and the second end 14 extends into the first stepped region 20. In one such embodiment, the first stepped region 20 is proximate an upper surface of the belting 10 and the second stepped region 20 is proximate a lower surface of the belting 10 as illustrated in the figures.

The first stepped region 20 has a length that is similar to a length of the second stepped region 22. As used herein, the term length means a distance from a proximal end of the first stepped region 20 to a distal end of the first stepped region 22. Similar terminology would apply to the second stepped region 22. The first stepped region 20 and the second stepped region 22 may extend substantially between opposite edges of the belting.

The surfaces on the first stepped region 20 and the second stepped region 22 that are adjacent to each other when the first end 12 is attached to the second end 14 are referred to as mating surfaces. The first stepped region 20 and the second stepped region 22 may be shaped so that the mating surfaces are adjacent to each other over a significant portion of the length thereof. In certain embodiments, the mating surfaces may be generally linear. In other embodiments, at least a portion of each of the mating surfaces may be non-linear such as curved.

Figure 3:
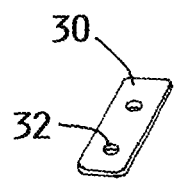
FIG. 3 is a perspective view of a reinforcing member for use in the belting connection mechanism.

At least one of the first stepped region 20 and the second stepped region 22 may include a reinforcing member 30. In certain embodiments, the reinforcing member 30 may be a substantially flat bar as illustrated in FIG. 3.

The reinforcing member 30 may have a length that that is similar to a distance between side edges of the belting 10. In other embodiments, the length of the reinforcing member 30 may be less than the distance between the side edges of the belting so that the reinforcing member 30 is recessed within the belting 10.

The reinforcing member 30 should be sufficiently wide to provide the reinforcing member 30 with sufficient strength. As used herein, the term width means a distance between leading and trailing edges of the reinforcing member 30 as the belting 10 is moved with respect to the equipment on which the belting 10 is installed. On the other hand, a width of the reinforcing member 30 should not be too great because that could reduce the flexibility of the belting 10.

In certain embodiments, the reinforcing member 30 is fabricated from a generally rigid material. This configuration may be suitable for where an end roller of the conveyor has a radius that is greater than a width of the reinforcing member 30. In other embodiments, the reinforcing member 30 is fabricated from a flexible material. This configuration may be suitable for where the end roller of the conveyor belt has a radius that is not greater than a width of the reinforcing member 30.

The reinforcing member 30 should be fabricated from a material having a strength that is greater than the strength of the other materials used to fabricate the belting 10 such as the first stepped end 20 and the second stepped end 22. In one such embodiment, the reinforcing member 30 is fabricated from a metallic material. Examples of other materials that may be used to fabricate the reinforcing member 30 include polymers and fiberglass.

The reinforcing member 30 may be at least partially recessed in the first stepped region 20 and/or the second stepped region 22 on which the reinforcing member 30 is associated. In certain embodiments, the reinforcing member 30 is substantially covered by the first stepped region 20 and/or the second stepped region 22 on which the reinforcing member 30 is associated.

The reinforcing member 30 has at least one aperture 32 formed therein as illustrated in FIG. 3. When the opposite ends of the belting 10 are placed adjacent to each other, a fastener 34 is extended through the apertures 32 in the first and second stepped regions 20, 22 to retain the belting 10 in a use configuration. Examples of suitable fasteners 34 include screws, bolts and rivets.

The reinforcing member 30 may be incorporated into the belting 10 during the manufacturing process. In one such embodiment, fabric 36 is wrapped around the reinforcing member 30 as illustrated in FIG. 2. A person of skill in the art will appreciate that the fabric may have a variety of configurations such as the fabric typically used in conveyor belts. Rubber is thereafter vulcanized over the fabric 36 and the reinforcing member 30 to form the belting 10. The invention thereby permits forming the belting in a one-step process.

While wrapping the fabric 36 around the belting 10 enhances the strength of the belting 10, it is not necessary for the fabric 36 to be wrapped around the reinforcing member 30 to achieve the advantageous results of this invention because the vulcanizing process causes the rubber to be bonded to the fabric 36 and the reinforcing member 30. A person of skill in the art will appreciate that alternative configurations are also possible. For example, the fabric 36 may be attached to the reinforcing member 30 prior to the vulcanizing process.

The flexibility of the first and second stepped regions 20, 22 may be selected based upon a diameter of the rollers at opposite ends of the conveyor. As a size of the rollers increases, the first and second stepped regions 20, 22 may be less flexible while as the size of the rollers decreases, the first and second stepped regions may be more flexible.

The lower surface of the belting 10 may include a recess 38 proximate where the fastener 34 extends therethrough such as illustrated in FIG. 2. The depth of the recess 38 is sufficiently large such that the fastener 34 does not extend beyond the lower surface of the belting 10. Using such a configuration minimizes wear of the fastener 34 as the belting 10 moves in the equipment.

In certain embodiments, the recess 38 has a size and a shape that are similar to but larger than the shape of the fastener 34. In other embodiments, the recess 38 is in the shape of a channel that extends across the width of the belting 10.

Depending on the intended use of the belting 10, a connecting rod 40 may be attached to the surface of the belting 10 using the fastener 34. Each of the connecting rods 40 may have an elongated shape and extend at least partially between opposite side edges of the belting 10. A person of skill in the art will appreciate that the connecting rods 40 may have a variety of shapes depending on the intended use of the equipment on which the belting 10 is installed.

In use, belting 10 having a configuration illustrated in FIGS. 1 and 2 is extended around the equipment on which the belting 10 is intended to be used. The first and second ends 12, 14 of the belting 10 are placed adjacent to each other so that the first and second stepped regions 20, 22 seat within each other as illustrated in FIGS. 1 and 2.

The connecting rod 40 is positioned over the first and second ends 12, 14 of the belting 10 and the fastener 34 is extended through the apertures 32 that extend through the first and second stepped regions 20, 22. The belting 10 is ready for use. A similar process can be used in conjunction with the embodiment illustrated in FIGS. 4 and 5.

Figure 4:
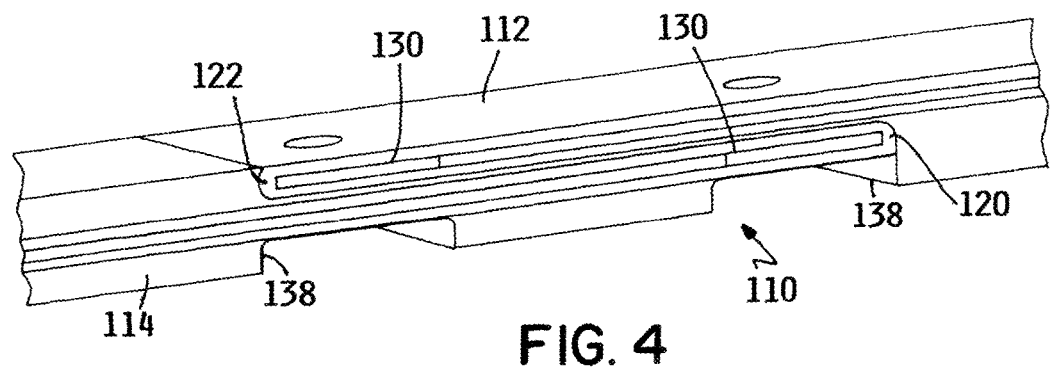
FIG. 4 is a perspective view of the belting connection mechanism according to another embodiment of the invention.
Figure 5:
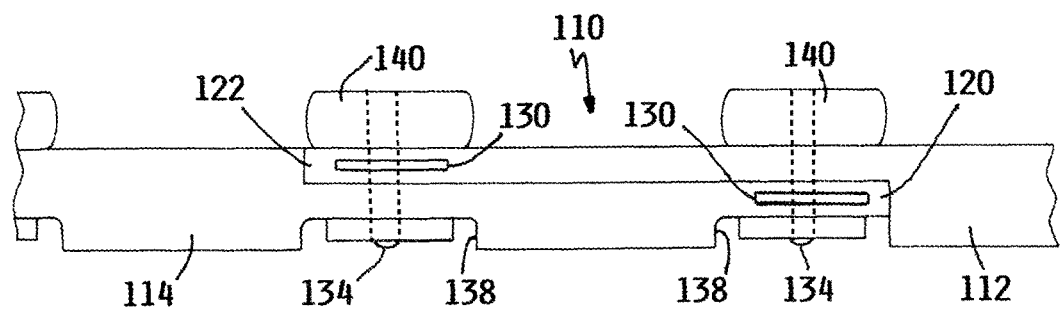
FIG. 5 is a side view of the belting connection mechanism of FIG. 4 with a connecting rod attached hereto.

Another embodiment of the invention, which is illustrated in FIGS. 4 and 5, utilizes first and second stepped regions 120, 122 having a greater length as compared to the length of the first and second stepped regions 20, 22 that are illustrated in FIGS. 1 and 2.

This configuration of the first and second stepped regions 120, 122 facilitates the use of more than one connection point for attaching the first and second ends 112, 114 of the belting 110 to each other. This embodiment thereby spreads the force associated with retaining the first and second ends 112, 114 of the belting 110 in the use configuration to potentially increase the useful life of the belting 110.

In certain embodiments, the apertures are all aligned along an axis that extends from the first end of the belting 110 to the second end of the belting 110. In certain embodiments, the first and second stepped regions 120, 122 are capable of flexing between the apertures formed therein.

In one suitable configuration, the first and second stepped regions 120, 122 extend between two connection points. At least one of the first and second stepped regions 120, 122 each include a reinforcing member 130 proximate a distal end thereof. The reinforcing member 130 may have a similar configuration to the reinforcing member 30 discussed with respect to FIGS. 1 and 2.

While FIGS. 4 and 5 illustrate that one reinforcing member 130 is included in each of the first and second stepped regions 120, 122, it is also possible for each of the first and second stepped regions 120, 122 to include two reinforcing members 130. The two reinforcing members 130 on each of the first and second stepped regions 120, 122 would be aligned with each other.

A fastener 134 is extended through the apertures 132 in the first and second stepped regions 120, 122 to attach the first and second ends 112, 114 of the belting 110 together. Similar to the embodiment illustrated in FIGS. 1 and 2, a connecting rod 140 may be attached to the belting 110 with the fasteners 134.

Depending on factors such as the equipment on which the belting 110 is used and the forces that are anticipated to be placed on the belting 110 during such use, it is possible for the first and second ends 112, 114 to include more than two connection points. A person of skill in the art would appreciate that the concepts described herein would be extended to facilitate such embodiments.

Figure 6:
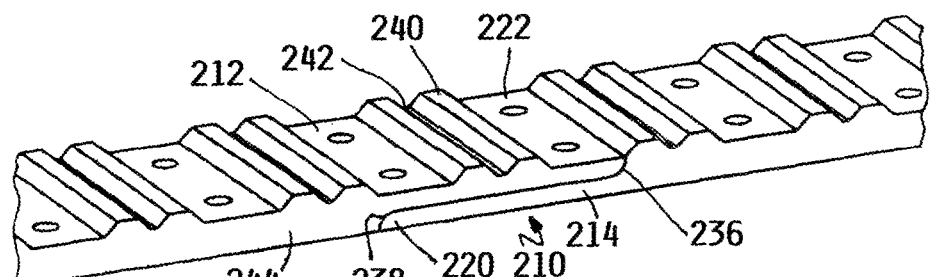
FIG. 6 is a perspective view of another embodiment of the belting connection mechanism.

Another embodiment of the belting connection mechanism is illustrated in FIG. 6. The aspects of the invention that are not described as being different than the other embodiments in this application are the same as the other embodiments in this application.

Proximate an intersection of the lower surface and the end surface of the first stepped region 220, a curved region 236 is provided and such curve region 236 has a relatively large curvature radius. In one such embodiment, the radius of curvature is sufficiently large such that more than 50 percent of the end surface is curved. In other embodiments, substantially all of the end surface is curved.

When the first and second ends 212, 214 are placed in an attachment position such as is illustrated in FIG. 6, the surface of the second stepped region 222 that is adjacent to the curved region 236 has a shape that is similar to the shape of the curved region 236. In certain embodiments, the curvature of the second stepped region 222 that is adjacent to the curved region 238 is substantially similar to the curved region 236.

The end surface of the second stepped region 222 has a curved surface 238 that is similar to the curved surface on the first stepped region 220. The surface of the first stepped region that is adjacent to the curved region 238 has a shape that is similar to the shape of the curved region 238.

Using the preceding configurations for the ends of the first and second stepped regions 220, 222 enhances the durability of the belting connection mechanism because it reduces rubbing of the components during the operation of the belting.

An upper surface of the belting 210 includes a plurality of cleats 240 extending therefrom. The cleats 240 are provided in a spaced-apart configuration. At least one relief channel 242 is formed in each of the cleats 240. In certain embodiments, there is one relief channel 242 in each of the cleats 240 as illustrated in FIG. 6.

The relief channel 242 may have a depth that is similar to a height of the cleat 240 in which the relief channel 242 is formed. In other embodiments, the depth of the relief channel 242 is less than the height of the cleat 240 in which the relief channel 242 is formed. The relief channel 242 thereby increases the flexibility of the belting 210.

Opposite edges of the relief channel 242 may be oriented at an oriented at an angle. In certain embodiments, the angle is between about 30 degrees and about 60 degrees. In other embodiments, the angle is about 45 degrees.

On each of the embodiments of the belting connection mechanism, the edges of the belting may be sealed to prevent moisture absorption and fabric exposure. A person of skill in the art will appreciate that a variety of materials may be used to seal the edges of the belting.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A belting connection in attaching a first end and a second end of belting, wherein the belting has a thickness and wherein the belting connection mechanism comprises:
    a first stepped region proximate the first end, wherein the first stepped region has a first aperture formed therein and wherein the first stepped region has a first thickness;
    a second stepped region proximate the second end, wherein the second stepped region has a second aperture formed therein and wherein the second stepped region has a second thickness;
    a reinforcing member associated with at least one of the first stepped region and the second stepped region;
    a fabric base, disposed within the belting, the fabric base being at least partially wrapped around the reinforcing member; and
    a first fastener that extends through the first aperture and the second aperture to attach the first end to the second end, wherein the first stepped region at least partially overlaps the second stepped region when the first end is attached to the second end and wherein when the first end is attached to the second end, the first stepped region and the second stepped region have a combined thickness that is no greater than the thickness of the belting.

2. The belting connection mechanism of claim 1, wherein the reinforcing member is substantially covered by the first stepped region or the second stepped region in which the reinforcing member is associated.

3. The belting connection mechanism of claim 1, wherein the reinforcing member is fabricated from a flexible material having a strength that is greater than a strength of the first stepped region on which the reinforcing member is associated.

4. The belting connection mechanism of claim 1, wherein the belting comprises a first belting strip, a second belting strip and a connecting rod, wherein the first stepped region is provided on the first belting strip and the second belting strip, wherein the second stepped region is provided on the first belting strip and the second belting strip, wherein the connecting rod has a first end and a second end, wherein the first end of the connecting rod is attached to the first belting strip with the first fastener and wherein the second end of the connecting rod is attached to the second belting strip with a second fastener.

5. The belting connection mechanism of claim 1, wherein the first stepped region further comprises a third aperture formed therein, wherein the second stepped region further comprises a fourth aperture formed therein, wherein the belting has an axis that is oriented to extend between the first end and the second end, wherein a second fastener extends through the third aperture and the fourth aperture and wherein the first aperture, the second aperture, the third aperture and the fourth aperture are aligned along the axis when the first end is attached to the second end.

6. The belting connection mechanism of claim 1, wherein the first stepped region comprises a first mating surface, wherein the second stepped region comprises a second mating surface, wherein the first mating surface is adjacent to the second mating surface when the first end is attached to the second end and wherein the first mating surface has a shape that is substantially complementary to a shape of the second mating surface.

7. The belting connection mechanism of claim 6, wherein at least a portion of the first mating surface is non-linear.

8. The belting connection mechanism of claim 1, wherein the belting has a plurality of cleats extending from a surface thereof and each of the plurality of cleats has a relief channel formed in a surface thereof that is opposite the belting.

9. The belting connection mechanism of claim 8, wherein the relief channel has a leading edge and a trailing edge, wherein the leading edge is oriented at an angle with respect to the trailing edge that is between about 30 degrees and about 60 degrees.

10. A conveyor belt comprising:
    belting having a first end and a second end, wherein the belting has a thickness and wherein the belting comprises:
    a fabric base that is substantially coated with a rubber material;
    a first stepped region proximate the first end, wherein the first stepped region has a first aperture formed therein;
    a second stepped region proximate the second end, wherein the second stepped region has a second aperture formed therein; and
    a reinforcing member associated with at least one of the first stepped region and the second stepped region, the fabric base being at least partially wrapped around the reinforcing member before the fabric base is coated with the rubber material; and
    a first fastener that extends through the first aperture and the second aperture to attach the first end to the second end, wherein when the first end is attached to the second end, the first stepped region and the second stepped region have a combined thickness that is no greater than the thickness of the belting.

11. The conveyor belt of claim 10, wherein the reinforcing member is substantially covered by the first stepped region or the second stepped region in which the reinforcing member is associated.

12. The conveyor belt of claim 10, wherein the reinforcing member is fabricated from a flexible material having a strength that is greater than a strength of the first stepped region on which the reinforcing member is associated.

13. The belting connection mechanism of claim 10, wherein the belting comprises a first belting strip, a second belting strip and a connecting rod, wherein the first stepped region is provided on the first belting strip and the second belting strip, wherein the second stepped region is provided on the first belting strip and the second belting strip, wherein the connecting rod has a first end and a second end, wherein the first end of the connecting rod is attached to the first belting strip with the first fastener and wherein the second end of the connecting rod is attached to the second belting strip with a second fastener.

14. The conveyor belt of claim 10, wherein the first stepped region further comprises a third aperture formed therein, wherein the second stepped region further comprises a fourth aperture formed therein, wherein the belting has an axis that is oriented to extend between the first end and the second end, wherein a second fastener extends through the third aperture and the fourth aperture and wherein the first aperture, the second aperture, the third aperture and the fourth aperture are aligned along the axis when the first end is attached to the second end.

15. The conveyor belt of claim 10, wherein the first stepped region comprises a first mating surface, wherein the second stepped region comprises a second mating surface, wherein the first mating surface is adjacent to the second mating surface when the first end is attached to the second end and wherein the first mating surface has a shape that is substantially complementary to a shape of the second mating surface.

16. A method of connecting belting having a first end and a second end, wherein the belting has a thickness and a fabric base disposed within the belting, and wherein the method comprises:
    providing a first stepped region proximate the first end, wherein the first stepped region has a first aperture formed therein and wherein the first stepped region has a first thickness;
    providing a second stepped region proximate the second end, wherein the second stepped region has a second aperture formed therein and wherein the second stepped region has a second thickness;
    associating a reinforcing member with at least one of the first stepped region and the second stepped region;
    at least partially wrapping the fabric base around the reinforcing member;
    positioning the first stepped region at least partially overlapping the second stepped region; and
    extending a first fastener through the first aperture and the second aperture to attach the first end to the second end, wherein when the first end is attached to the second end, the first stepped region and the second stepped region have a combined thickness that is no greater than the thickness of the belting.

17. The method of claim 16, wherein the belting comprises a first belting strip, a second belting strip and a connecting rod, wherein the first stepped region is provided on the first belting strip and the second belting strip, wherein the second stepped region is provided on the first belting strip and the second belting strip, wherein the connecting rod has a first end and a second end and wherein the method further comprises:
    attaching the first end of the connecting rod to the first belting strip with the first fastener; and
    attaching the second end of the connecting rod to the second belting strip with a second fastener.

18. The method of claim 16, wherein the belting has an axis that is oriented to extend between the first end and the second end and wherein the method further comprises:
    forming a third aperture in the first stepped region;
    forming a fourth aperture in the second stepped region;
    extending a second fastener through the third aperture and the fourth aperture, wherein the first aperture, the second aperture, the third aperture and the fourth aperture are aligned along the axis when the first end is attached to the second end.

19. The method of claim 16, wherein the first stepped region comprises a first mating surface, wherein the second stepped region comprises a second mating surface, wherein the first mating surface is adjacent to the second mating surface when the first end is attached to the second end and wherein the first mating surface has a shape that is substantially complementary to a shape of the second mating surface.

* * * * *